March 30, 1965  E. J. JOHNSTON ETAL  3,175,343
HAY CONDITIONER LIFTING MECHANISM
Filed May 29, 1963  4 Sheets-Sheet 2

Inventors:
Edward J. Johnston
Peter J. Peacock
John J. Kownacki
Atty.

March 30, 1965 E. J. JOHNSTON ETAL 3,175,343
HAY CONDITIONER LIFTING MECHANISM
Filed May 29, 1963 4 Sheets-Sheet 3

Inventors:
Edward J. Johnston
Peter J. Peacock

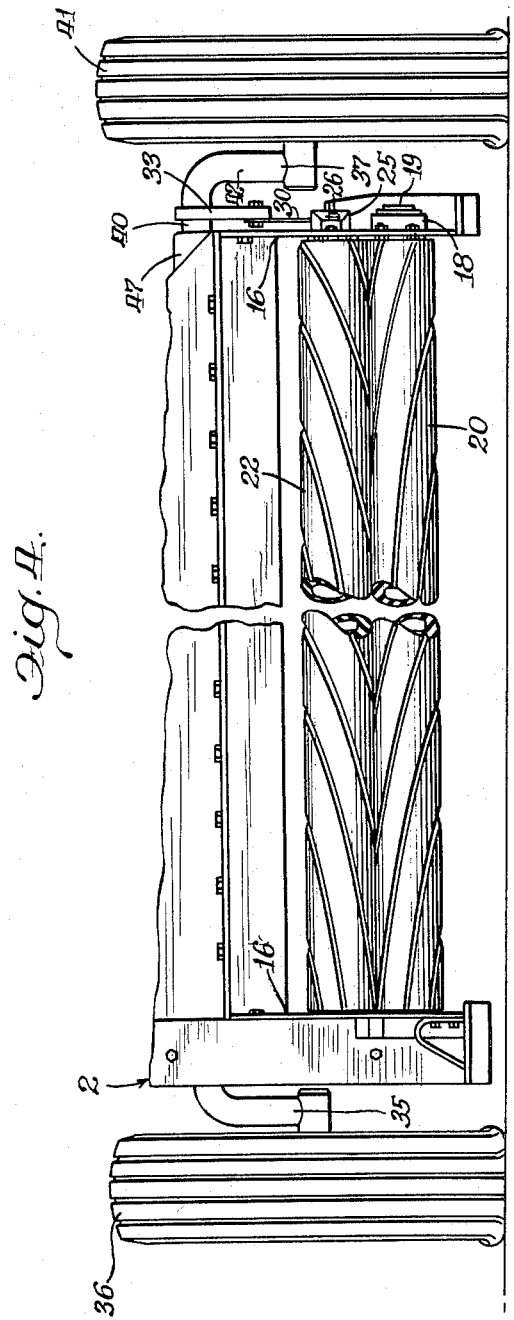

United States Patent Office 3,175,343
Patented Mar. 30, 1965

3,175,343
HAY CONDITIONER LIFTING MECHANISM
Edward J. Johnston, La Grange Park, and Peter J. Peacock, Lisle, Ill., assignors to International Harvester Company, Chicago, Ill., a corporation of New Jersey
Filed May 29, 1963, Ser. No. 284,113
5 Claims. (Cl. 56—1)

This invention relates to hay conditioners and more specifically to a novel support structure therefor.

Hay conditioners heretofore available have featured the provision of a pair of axially aligned wheels which are disposed in supporting relation to the hay conditioning units. Such units position the conditioning rolls thereof so that the rolls pick the crops directly from the field forwardly of the wheels. We have found that in such constructions considerable difficulty is experienced in the feeding of the rolls to prevent them from plugging. This condition accrues from the fact that at the grassward end of the rolls there is usually more accumulation of material than at the stubbleward ends inasmuch as when a mower is cutting down a field of crops the outer mower shoe has a tendency to windrow or to pull some of the crops over. This is an attempt to clear the mower when it is cutting the next adjacent swath and to keep the swaths separated one from the other. However, in fact, there is no clean cut line of division between adjacent swaths and it has been found that the outboard ends of the rolls tend to gather not only the material directly in front of the rolls but to pull on the material which is disposed outwardly thereof, that is, on the grassward side thereof. Such conditions cause the rolls to pass excessive material at one end which tends to spread the rolls and furthermore causes this excess material to plug the outboard sections of the rolls which leads to frequent stoppages.

A general object of the invention is to provide a novel hay conditioner which is tiltable about a fore-and-aft axis in order to vary the inclination of the hay conditioner rolls transversely of the direction of movement across the field so as to equalize the feed of the material throughout the extent of the rolls.

A further object of the invention is to provide a novel support for the hay conditioning rolls on fore-and-aft offset wheels, the cropward wheel being disposed ahead of the stubbleward wheel whereby the hay conditioning rolls, which extend transversely between the wheels, are supported on an axis which is diagonal or oblique with respect to the direction of movement of the unit over the field, the framework supporting the rolls being connected to a forwardly extending tongue which when swung about the axis of support of the rolls causes the cropward ends of the rolls to elevate and the stubbleward ends of the rolls to move downwardly, thus gauging the lower edge of the lower pickup roll so that it approximates the level of the crops in the field to obtain proper draw thereon so that it feeds generally uniformly.

A further object of the invention is to arrange the forward or cropward wheel of the hay conditioner so that it serves as a pressdown or winder so that any crops which may be pulled by the rolls endwise from the adjacent swath are caused to separate since the cropward support wheel is slightly ahead of the hay conditioning rolls.

These and other objects and advantages inherent in and encompassed by the invention will become more readily apparent from the specification and drawings, wherein:

FIGURE 4 is a rear view with parts broken away taken substantially on the line 4—4 of FIGURE 2.

Figure 1:
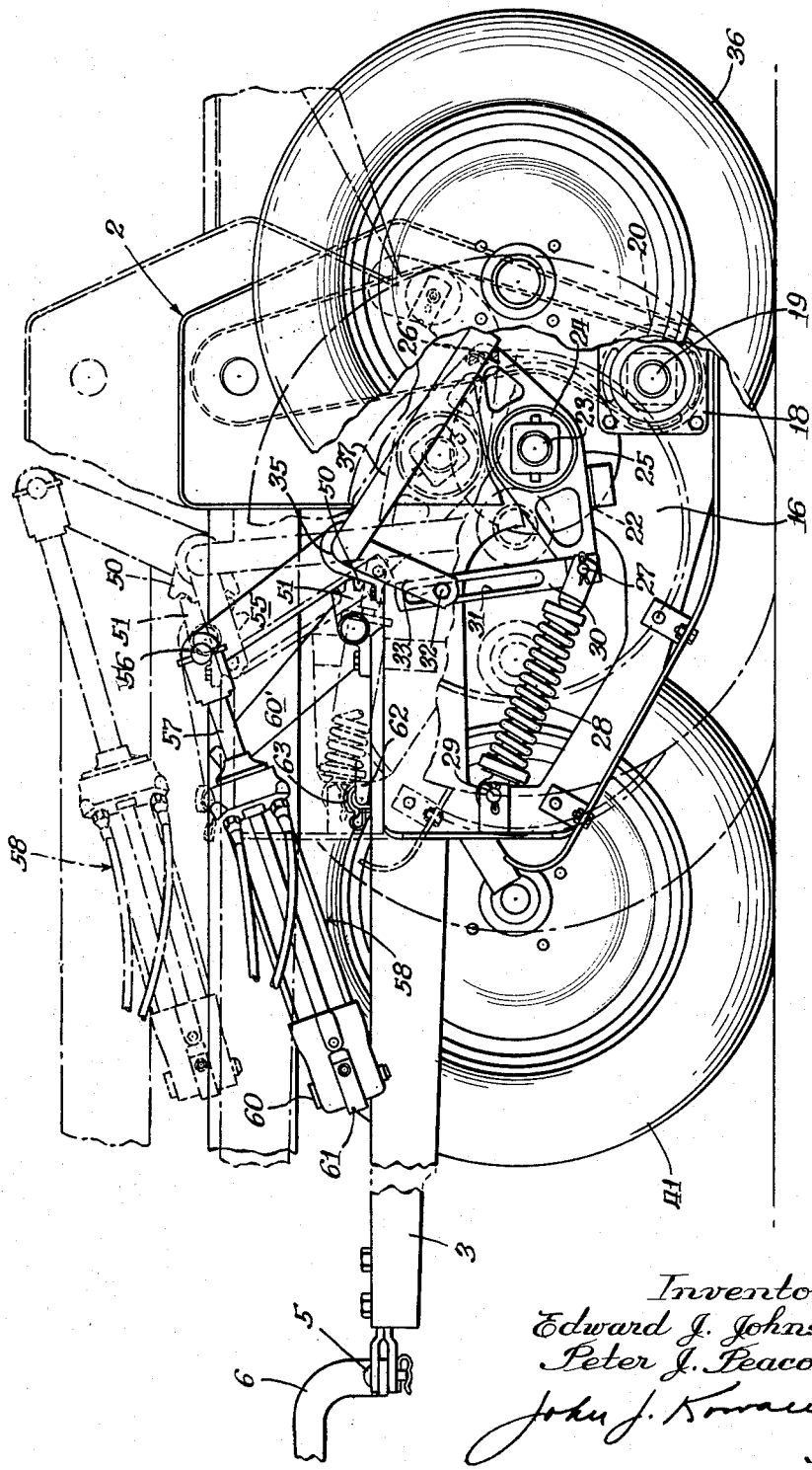
FIGURE 1 is a side elevational view, partly broken away of the novel hay conditioner showing the various positions thereof in phantom lines.
Figure 2:
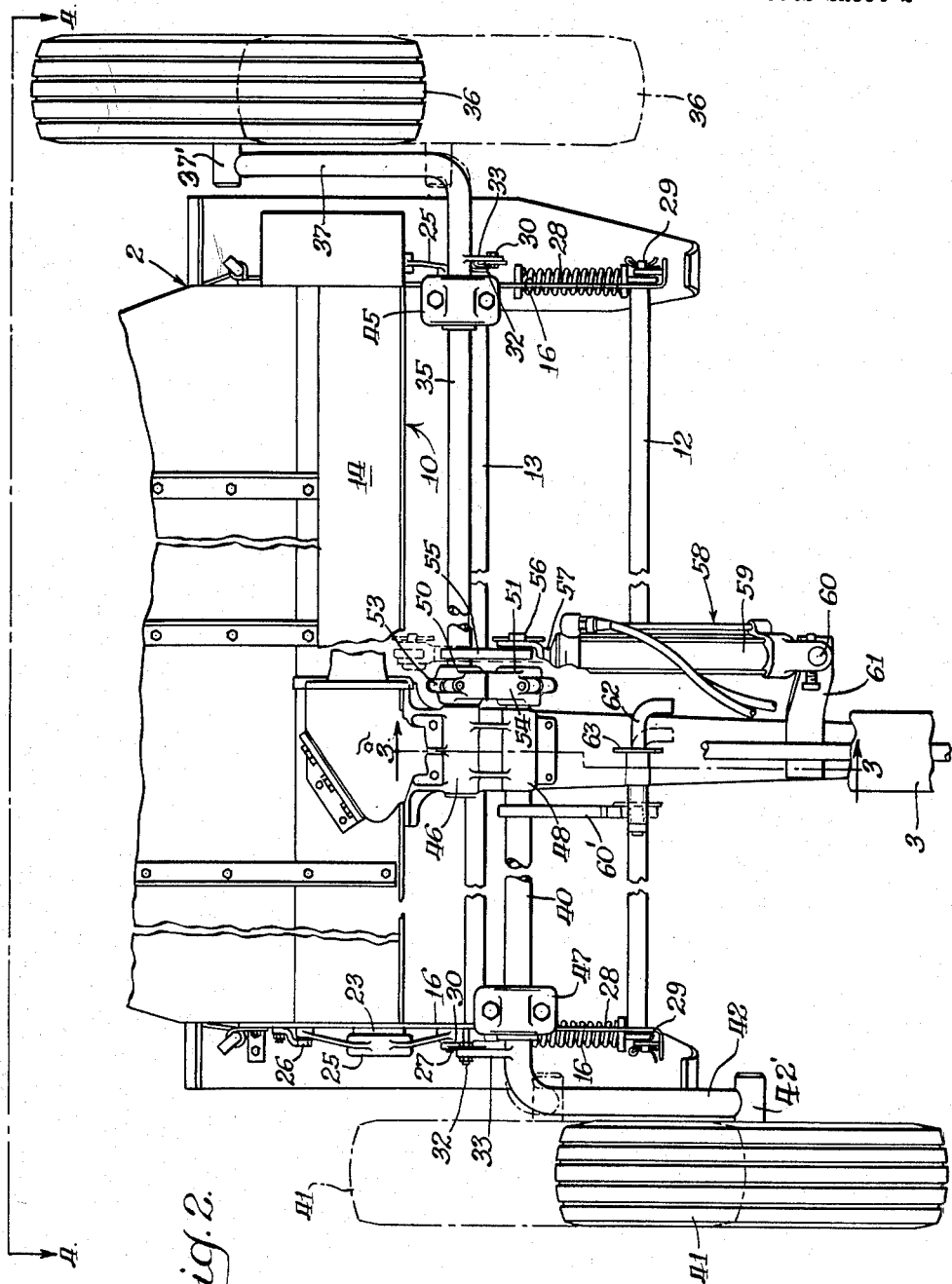
FIGURE 2 is a fragmentary plan view of the structure shown in FIGURE 1.

Describing the invention in detail and having particular reference to the drawing, there is shown a hay conditioner generally designated 2 which comprises a fore-and-aft extending drawbar or draft member in the form of a tongue 3 which, at its forward end, is connected as by a pin 5 to a vertically movable drawbar 6 which is mounted on the associated prime mover such as a tractor or the like. It will be realized that lowering and elevating of the drawbar 6 will position the tongue accordingly.

The tongue 3 is connected to the framework or the frame structure generally designated 10 of the hay conditioner, said frame structure including transverse beam members 12 and 13 as well as the sheet metal beam structure 14, said members 12, 13, and 14 being interconnected intermediate their ends with the rear end of the tongue 3 and at their lateral edges being connected to upstanding panels or side support members 16, 16.

Each panel 16 is provided with the bearing structure 18 which supports the adjacent end of the bearing shaft 19 of the lower hay conditioning roller 20 adjacent to the lower side of the framework. The roller 20 may be of any convenient construction such as metal or rubber, a combination of metal and flexible elastomer material, and cooperates with an upper hay conditioning roller indicated 22, which has a center shaft 23 supported at each end on a bearing 24 which is carried on a lever 25 intermediate the ends thereof. Each lever 25 is pivoted as at 26 on a pin secured to the adjacent side wall 16 and at its forward end the lever 25 is pivoted as at 27 to a spring-loaded biasing means 28 in a toggle arrangement therewith, said biasing means being pivoted as at 29 to a portion of the respective side panel 16. This structure is adequately shown and described in U.S. Patent No. 3,039,256.

The pin 27 is connected to the lower end of a strap 30 which has a lost-motion connection through a slot 31 and a pin 32 to an operating lever arm 33. The leftward arm 33 is secured to a pivot shaft or rockshaft 35 of the leftward wheel 36 which is connected to the shaft 35 by means of a crank arm 37 which extends rearwardly in the lowered position of the machine with respect to the rockshaft 35, said arm 37 having a spindle 37' mounting wheel 36. The rightward arm 33 is connected to the rockshaft 40 which supports the wheel 41 which is connected to the rockshaft 40 by means of the crank arm 42, said arm 42 having a spindle 42' mounting wheel 41. In the lowered position of the machine arm 42 extends forwardly from the rockshaft 40 alongside the grassward side of the machine whereas the wheel 36 normally moves along the stubble or where the grass has been previously cut or harvested. The shaft 35 is rotatably mounted in bearings 45, 46 which are respectively mounted on the beam member 13 and the rear end of the tongue structure 3 and beam member 14, and the rockshaft 40 is mounted parallel to the rockshaft 35 transverse to the direction of the movement of the machine and is mounted in bearings 47 and 48 which are respectively mounted on the member 13 and on the tongue 3.

The shafts 35 and 40 are provided with sector gears 50 and 51, respectively, which are suitably connected thereto by means of the clamps 53, 54 integral with the gears.

Figure 3:
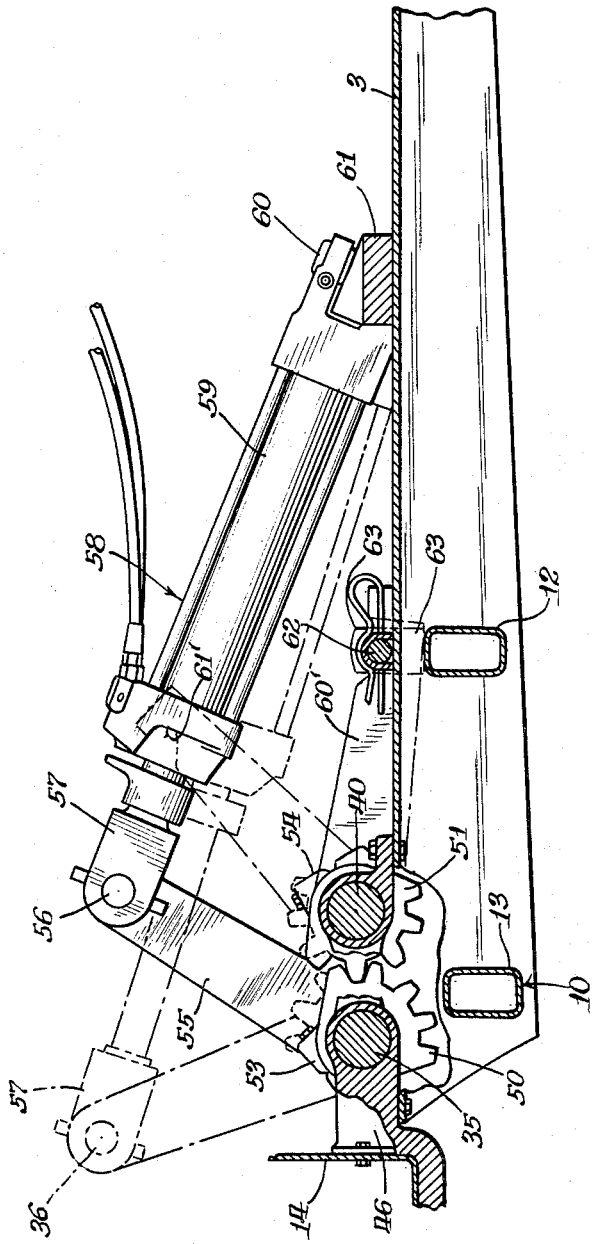
FIGURE 3 is an enlarged sectional view taken substantially on the line 3—3 of FIGURE 2.

Shaft 35 is provided with an operating arm 55 which at its free end is pivotally connected as by pin 56 to the piston rod 57 of the hydraulic ram 58, the cylinder 59 of which is anchored as by pin 60 to an anchor 61 which is mounted on the tongue 3. It will be noted that actuation of the cylinder 57 to an extended position, as shown in phantom lines in FIGURES 1 and 3, causes on the leftward side of the machine rotation of the shaft 35 in a direction swinging the crank arm 37 and the rearward or stubbleward wheel 36 thereon to advance forwardly and downwardly and simultaneously causes the gearing 50, 51 to reverse rotation of the rockshaft 40 and therefore swinging the crank arm 42 downwardly whereby the forward or grassward wheel 41 follows downwardly and rearwardly and the rightward side of the machine is elevated. In will be noted that simultaneously with the elevation of the machine the respective straps 30 move upwardly and therefore raise the points 27 and swing the support levers 25 upwardly and thus elevate the upper roll 22 from the stationary lower roll 20 thus opening the gap between the rollers to accommodate the passage of material which tends to choke between the rollers. This separated position is also effected to prevent the rollers from obtaining flat-spot-set when the machine is not in use and for this purpose and in order to free the hydraulic cylinder there is provided an arm 60' on the rockshaft 40, the arm 60 being positionable with its free hook end 61' beneath the pin 62 which is mounted on a bracket 63 carried by the frame member 12 as best seen in FIGURE 3. Under these circumstances with the lever arm 60' hooked to the frame structure, the cylinder or ram 58 may be removed for use on other machines.

In the present invention it has been found that by locating the wheels 36, 41 in offset relationship several extraordinary results accrue. The first of which is that wheel 41 by being located slightly ahead but immediately along the adjacent ends of the hay conditioning rollers serves as a divider or holddown device which prevents the material from being pulled endwise from the swath which is adjacent the machine on the grassward side thereof. Thus the amount of material available to the machine is controlled and plugging is substantially eliminated. The second feature which accrues with the present invention is that in having the wheels offset manipulation of the tongue 3, that is elevating or lowering of the drawbar 6, causes the hay conditioning unit to rock about an axis which is diagonal or oblique with respect to tongue 3 that is in the direction of movement. Inasmuch as the machine is tilted about such an axis, elevation of the drawbar and thus the forward end of the tongue cause the rightward or grassward side of the machine to move upwardly whereas the stubbleward side of the machine will move downwardly. This obtains the capability of being able to gauge the position of the rollers with respect to the material itself so that the rollers approximate the slope of the material. It has been found that on the grainward or grassward side of the machine there is generally more material to handle and that this is caused by the mower outer shoe divider which has a tendency to fold the material into the swath in order to provide the cleaner division between the instant swath and the next adjacent swath. Because of this, the larger accumulation of material at one end of the swath than the other, if the machine is run parallel to the ground, an uneven amount of material is instantaneously presented to the rolls across the lengths thereof and the unit will plug. However, by elevating the grassward side of the machine and lowering the stubbleward side, where normally the least amount of material is on the ground, an optimum presentation of the lower roll to the crop is obtained and the machine then does not plow through the material but actually picks the material rapidly and more uniformly processes the material through the rollers.

Having described the preferred form of the invention, it will be realized that other variations will become readily apparent to those skilled in the art within the scope of the appended claims.

What is claimed is:

1. In a hay conditioner for processing adjacently cut swaths of hay, a frame, a pair of hay conditioning rolls mounted on the frame for gathering said swaths, supporting forward and rearward wheel means at opposite sides of the frame offset in a fore and aft direction relative to the line of travel of the conditioner, each wheel means swingable vertically about a transverse axis, said forward wheel means being disposed in advance of the rolls at the grassward side of the conditioner, said wheel means rotatable about points located in a plane diagonal to the line of travel and defining an effective axis, and means for tilting said conditioner about the effective axis of said wheel means for lowering the rolls at one of their ends and locating said ends closer to the ground while concurrently elevating the rolls at their other ends, and said frame including a pair of laterally spaced side supports, said means for tilting said conditioner comprising, a pair of parallel shafts rotatably mounted on the frame, one of said shafts extending beyond one of said supports and the other shaft beyond the other said support, an arm connected to each shaft outwardly of the respective support, a wheel spindle on each arm remote from the connection of the arm to the respective shaft, a wheel mounted on each spindle, one of the arms projecting forwardly of the rolls on the grassward side thereof and mounting said forward wheel means and the other of said arms projecting rearwardly, gear means on the shafts in meshing engagement, means for rotating said shafts for elevating and lowering said hay conditioner, and draft means extending forwardly from said frame and vertically swingable with the frame and rolls about the effective axis of said wheel means.

2. In a hay conditioner for processing adjacently cut swaths of hay, a frame, a pair of hay conditioning rolls mounted on the frame for gathering said swaths, supporting forward or rearward wheel means at opposite sides of the frame offset in a fore and aft direction relative to the line of travel of the conditioner, each wheel means swingable vertically about a transverse axis, said forward wheel means being disposed in advance of the rolls at the grassward side of the conditioner, said wheel means rotatable about points located in a plane diagonal to the line of travel and defining an effective axis, and means for tilting said conditioner about the effective axis of said wheel means for lowering the rolls at one of their ends and locating said ends closer to the ground while concurrently elevating the rolls at the other ends.

3. In a crop conditioning machine for processing adjacently cut swaths of hay, a frame, cooperative hay conditioning rollers mounted on the frame and disposed transversely to the line of traverse of the machine over the field for gathering said swaths directly from the field wheel means mounting the machine and including grassward wheel means disposed ahead of the rollers, said grassward wheel means detaining the grassward hay while said conditioning rollers are gathering the adjacent swath, and means tiltably mounting the machine about an axis offset from to said rollers and line of traverse.

4. The invention according to claim 3 wherein said axis extends diagonally with respect to the line of traverse of the conditioning machine.

5. The invention according to claim 2 wherein said conditioner comprises a forwardly extending draft tongue and said means tiltably mounting the machine comprising crank arms disposed at opposite ends of the machine and mounting respective wheel means for swinging movement vertically about substantial horizontal axes.

References Cited by the Examiner
UNITED STATES PATENTS 2,638,044  5/53  Toland _____ 280—43.33
2,989,830  6/61  Pristo _____ 56—1

T. GRAHAM CRAVER, Primary Examiner.
ANTONIO F. GUIDA, Examiner.